United States Patent [19]

Tyler

[11] 3,949,807

[45] Apr. 13, 1976

[54] AIR CONDITIONING SYSTEM WITH INTEGRAL ENERGY CONSERVING ELEMENTS

[75] Inventor: Hugh Jean Tyler, Santa Ana, Calif.

[73] Assignee: Robertshaw Controls Company, Richmond, Va.

[22] Filed: Aug. 30, 1974

[21] Appl. No.: 502,049

[52] U.S. Cl. .................. 165/16; 165/22; 165/27
[51] Int. Cl.² ........................................ F25B 29/00
[58] Field of Search ........................ 165/16, 27, 22

[56] References Cited
UNITED STATES PATENTS

| | | | |
|---|---|---|---|
| 2,978,228 | 4/1961 | Carlson | 165/27 |
| 3,051,451 | 8/1962 | Bierwirth et al. | 165/16 |
| 3,352,352 | 12/1967 | Walters | 165/16 |
| 3,410,486 | 11/1968 | Rodgers | 165/16 |
| 3,540,525 | 11/1970 | Bradshaw et al. | 165/16 |
| 3,743,010 | 7/1973 | Farney et al. | 165/27 |
| 3,768,545 | 9/1973 | Wills | 165/27 |
| 3,788,386 | 1/1974 | Demaray | 165/27 |
| 3,847,209 | 11/1974 | Mascall | 165/27 |

Primary Examiner—Albert W. Davis, Jr.
Assistant Examiner—James D. Liles
Attorney, Agent, or Firm—Fulwider Patton Rieber Lee & Utecht

[57] ABSTRACT

There is disclosed an air conditioning control system for a building which has zone temperature sensing means for generating a plurality of DC analog signals proportional to the deviation of the air temperature in a controlled zone from first and second set point temperatures. The signal generated by the deviation of the controlled zone air temperature below the lowermost set point temperature is applied to the controller of the air heating facility of the air condition system while the signal generated by deviation of the controlled zone air temperature above the highest set point temperature is applied to the control means for the air cooling facility of the air conditioning system. Ventilation damper means are provided in the air circulation facilities to control the proportion of return and fresh air supplied to the air conditioning system and the signal generated by the zone temperature sensing means when the controlled zone air temperature deviates to above the lowermost set point temperature is applied to the controller on the ventilation damper means whereby the proportion of fresh and return air is controlled in response thereto. In a typical embodiment the control system is employed with an air conditioning system including a plurality of air heating stages housed in a heating deck and a plurality of air cooling stages housed in a cooling deck. The air conditioning system is commonly employed in a building having a plurality of zones of controlled air temperature with air circulation facilities which include the necessary ducts to recycle zone air through the air conditioning system and blend therewith a controlled proportion of fresh or outside air. Individual zone damper means are placed in each of the air supply ducts from the heating and cooling decks to supply air from each of these decks in proportion to the demands of the individual zones. The zone air temperature sensing means, which is associated with each of the controlled zones, comprises a thermostatic device having two set point temperatures, typically a heating and ventilating set point temperature of about 68° and a cooling set point temperature of about 78° F.

The controls for the air conditioning system employed for the multiple zones are operative to select the control signal of the zone having the greatest heating demand and to apply this signal to the heating facility of the system. When a plurality of heating stages are employed the signal of maximum demand is applied to the stages in a progressive fashion to provide a staged or successive activation of the stages in response to a falling temperature and a phased deactivation of the stages in response to a rising temperature as the temperature approaches the lower set point temperature. The controls of the system are also operative to open the ventilation air damper of the air circulation facilities whereby outside air can be introduced into the cooling deck when the outside air is at a temperature close to or below the maximum set point temperature. There is a band of uncontrolled air temperature between the lower set point and upper set point temperatures through which the controlled zones are permitted to drift without activation of the heating or cooling facilities. Should the temperature of the warmest controlled zone, however, exceed the maximum set point temperature by a preset differential, the air cooling facility of the air conditioning system is activated. When a plurality of stages of air cooling are provided, these are activated in a progressive or staged fashion in response to a rising temperature of the warmest controlled zone and are successively deactivated as the control zone temperature approaches the maximum set point temperature.

9 Claims, 6 Drawing Figures

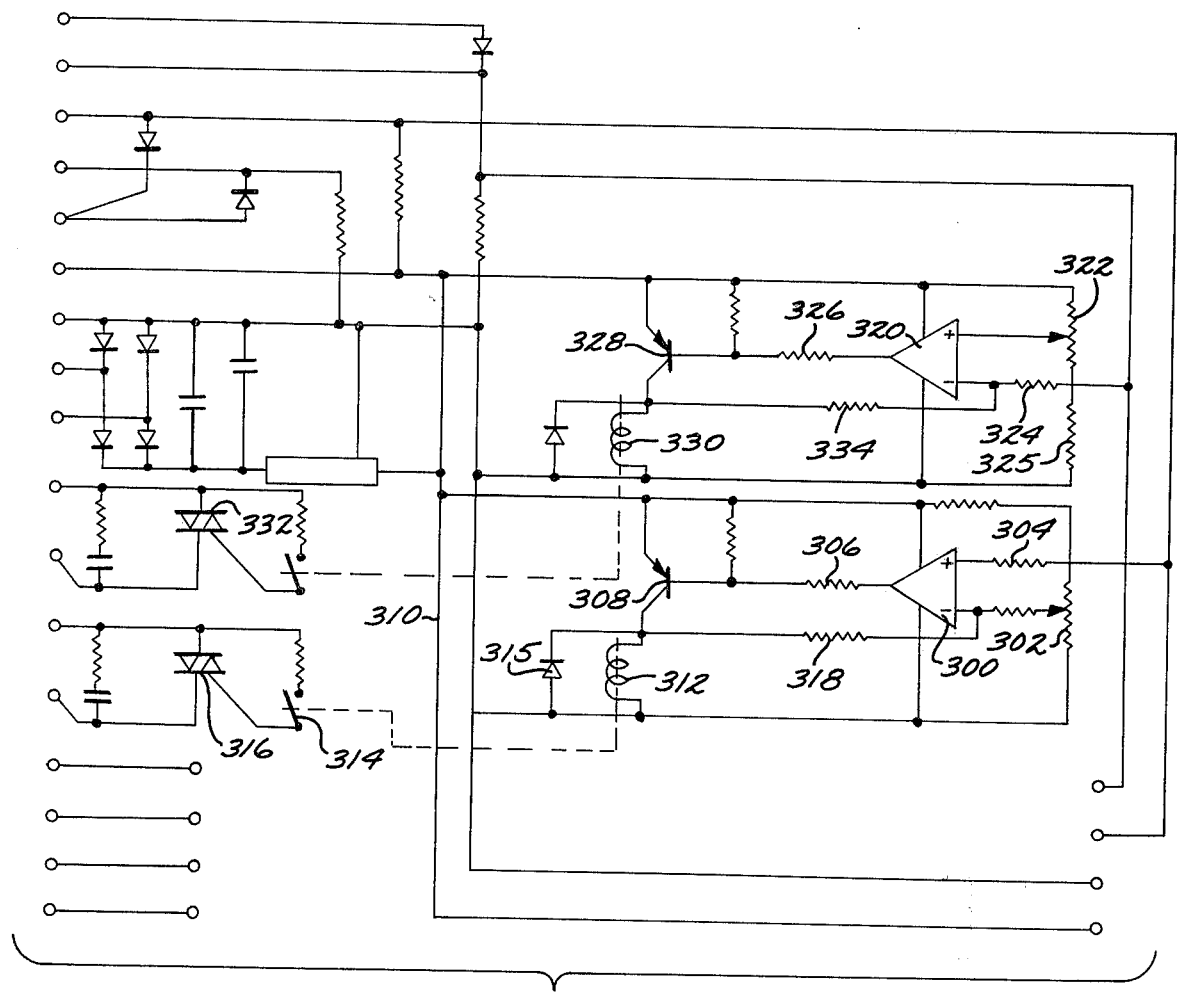
FIG.4
FIG.5
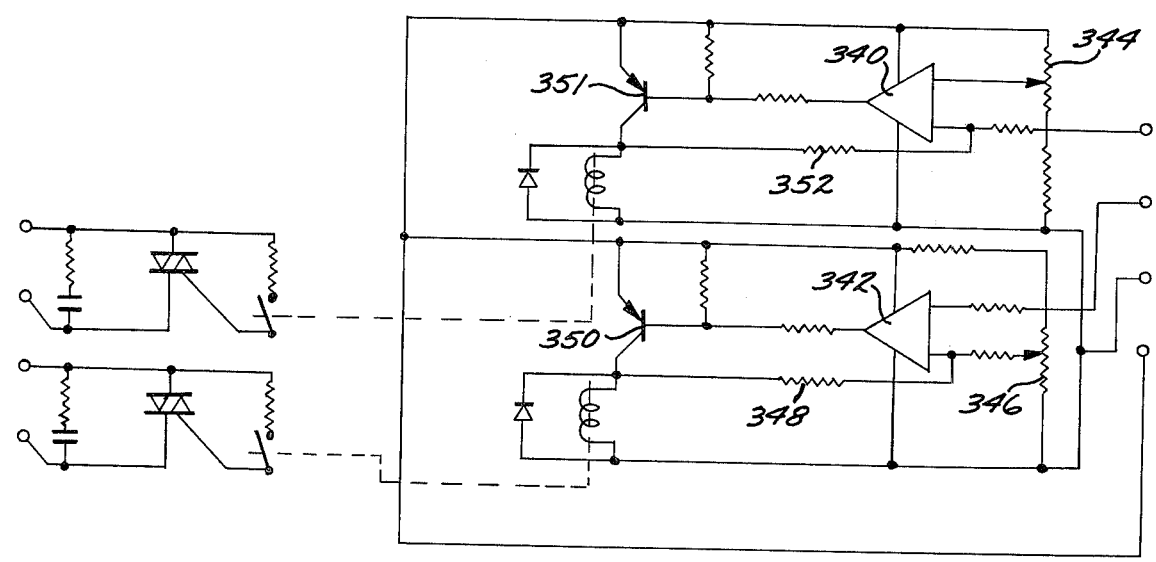

AIR CONDITIONING SYSTEM WITH INTEGRAL ENERGY CONSERVING ELEMENTS

BACKGROUND OF THE INVENTION

1. Field of the Invention:

This invention relates to an air conditioning system and, in particular, to a system having integral energy conservation means.

2. Prior Art

Air conditioning systems for providing one or more zones of controlled air temperature within a building have commonly employed a single thermostatic device in the controlled zone of the building which is operative to activate air heating or cooling means in response to deviation of the control zone temperature below or above a single set point temperature. In some of these systems, such as that disclosed in U.S. Pat. No. 3,567,115, the proportions of fresh and return air circulated through the system are varied in response to the heat content of the outside air and the heating and cooling demands of the controlled zone or zones. Central air conditioning systems are commonly employed to supply multiple zones and, in such applications, each zone can be provided with individual zone dampers in its cold air supply duct and in its hot air supply duct. These individual dampers are actuated in response to the temperature of the respective zone and have been mechanically interconnected and actuated by a common drive in the manner described in U.S. Pat. No. 3,788,386. The control means employed in air conditioning systems supplying multiple zones commonly have selective means whereby the air heating or cooling facilities of the system are controlled by the signal from the zone having the greatest demand for heating or cooling as described in U.S. Pat. No. 3,338,519.

While some attempts have been made to improve the efficiency of air conditioning systems, such as by providing primary and secondary air heating and cooling equipment and by operating this equipment under conditions which minimize cycling of the large energy demand primary facilities, heretofore, no attempt has been made to provide an air conditioning system that would include integral energy conservation means. In particular, no prior attempt has been made to provide an air conditioning system which has a low temperature set point for control of the heating and ventilation facilities with a higher temperature set point for control of the air cooling facilities.

BRIEF STATEMENT OF THE INVENTION

This invention comprises a control system for an environmental air conditioning system for a building having at least one zone of controlled air temperature therein. The air conditioning system includes air heating and air cooling means interconnected with air circulation facilities to return and recycle air from the controlled zone through the system and to blend therewith a controlled proportion of fresh air. The control system which is employed with the aforedescribed air conditioning system includes controller means for the ventilation damper to control the proportion of fresh and return air that is circulated through the air conditioning system and a plurality of air conditioning controller means, one each associated with a respective stage of air cooling means and stage of air heating means. There is provided in each of the controlled zones a temperature sensing means for generating a signal having a polarity and a magnitude proportional to the deviation of the controlled zone air temperature above or below a first set point temperature and a second signal having a magnitude proportional to the deviation of the zone air temperature above a second set point temperature, which is greater than the first set point temperature. The control system is provided with circuitry connected between the controlled zone temperature sensing means and the controller means for the air circulation damper and the air heating and cooling means to apply to the heating controller means a control signal which is proportional to the deviation of the zone temperature below the first set point temperature; to apply to the air ventilation damper controller means a control signal which is proportional to the deviation of the zone temperature above the first set point temperature; and to apply to the air cooling controller means a control signal that is proportional to the deviation of the zone temperature above the second set point temperature.

When the invention is applied to an air conditioning system having supply ducts to direct air from heating and cooling decks to a plurality of controlled zones with individual zone dampers in the supply ducts to each of the controlled zones, the circuitry of the control system also includes means to apply the aforesaid control signals to the actuators of the individual zone dampers.

The control system includes load analyzer circuit means whereby the air heating and cooling facilities are switched on and off at different levels of control signal input to introduce a controlled hysteresis in the control loop, thereby reducing the tendency of the air heating and cooling facilities to coast or oscillate about the control set point temperature. When the control system is employed with air conditioning systems having a plurality of stages of air heating and/or cooling, the load analyzer circuit means includes control means whereby the individual stages of air heating and/or cooling can be progressively phased into and out of operation in response to progressively increasing or decreasing demands.

In the preferred embodiment the controlled zone air temperature sensing means comprises a thermostatic device having a plurality of circuits, one circuit for each of the set point temperatures. The control zone temperature sensing means includes a DC analog signal generating means that can comprise a thermister which is in a control circuit with a constant current supply means whereby variation in sensed temperature produces an analog DC voltage signal. The voltage signals generated by the thermostatic circuits are applied to signal conditioning circuit means comprising operational amplifiers which receive reference voltage signals representative of the set point temperatures of the control zone and produce summation, output control signals having polarities and a magnitudes proportional to the deviation of the sensed air temperature from the set point temperatures.

BRIEF DESCRIPTION OF THE DRAWINGS

The invention will now be described with reference to the figures of which:

FIG. 4 illustrates the load analyzer circuit;

FIG. 5 illustrates a unitary module load analyzer circuit for additional air heating and cooling stages.

DESCRIPTION OF THE PREFERRED EMBODIMENTS

Figure 1:
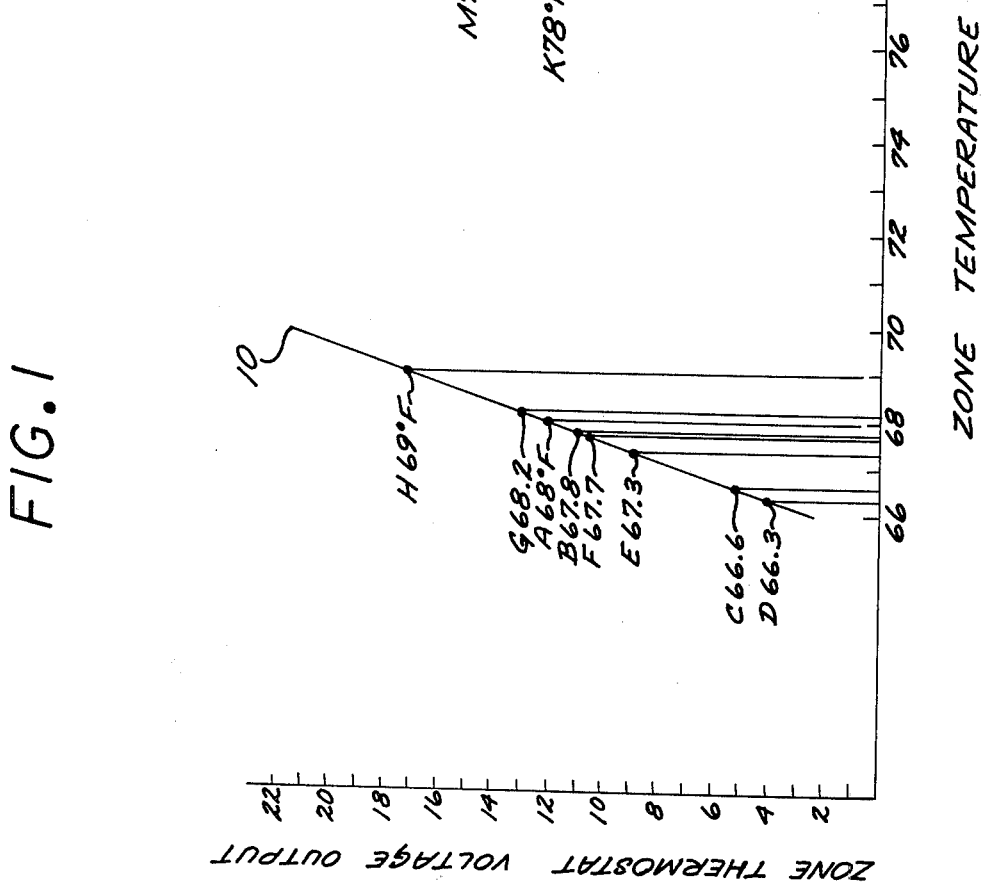
FIG. 1 graphically illustrates the operation of the air conditioning system.

Referring now to FIG. 1 there is a graphic depiction of the operation of the control system of the invention. The invention is illustrated with reference to a specific embodiment having specific values of controlled zone set point temperatures and control circuit voltage signals. This is intended to illustrate the most preferred embodiment only and is not intended to be limiting of the invention. As apparent to those skilled in the art, the system described herein can be widely adopted to various controlled zone set point temperatures and control signals voltages. As illustrated in FIG. 1, the control system has two set point air temperatures. These are 68° and 78°F. which are illustrated by points A and K respectively. The set point temperature A is used for the control of the heating and ventilation facilities of the air conditioning system while set point temperature K is employed for control of the air cooling facilities of the air conditioning system. FIG. 1 illustrates the thermostat output voltage as a function of control zone temperature and is typical of any or all of the controlled zone temperature sensing means employed in the individual controlled zones of the systems. As described hereinafter, when a plurality of zones are controlled with a single air conditioning system, the control zone having the greatest demand for air conditioning, i.e., the greatest deviation of air temperature from the set point temperature, produces the controlling signal for the air conditioning system. The air conditioning system which is operated by the control system of the invention comprises a typical air conditioning system which includes air heating and air cooling facilities and air circulation facilities to circulate the conditioned air to one or more zones of controlled air temperature and to return air therefrom for recirculation in the system. The air conditioning system also includes ventilation damper and exhaust damper facilities whereby the relative proportions of fresh and return air circulated through the controlled zones can be adjusted in a controlled manner. The control system in this application is responsive to outside air temperature or enthalpy and the controlled zone temperatures whereby outside air can be used when available as an inexpensive and low energy source of cooling for the controlled zones.

Referring to FIG. 1, line 10 is seen to pass through set point temperature A to illustrate the operation of the heating and ventilation facilities. As the air temperature in a controlled zone decreases from the set point temperature A the control means is operative to close the controlled zone's damper to the cooling supply duct and open the damper to the heating supply duct in a progressive manner until, when the temperature reaches point B (approximately 67.8° F.), the damper to the cooling supply duct is fully closed and that to the heating supply duct is fully opened. As the sensed temperature drops below point B and reaches point C (66.7° F.), the first stage of the heating means is activated. Should the air temperature continue to drop in any controlled zone such that the sensed temperature reaches point D (66.3°F.), the second stage of heating is activated. The air conditioning system can be supplied with a large number or plurality of heating stages and when many stages are employed they are preferably activated in a stage manner with each increment of approximately 0.5° F. decrease in the sensed temperature.

As the temperature in the controlled zone responds to the input of heating, the temperature rises and approaches the set point tempterature. As the temperature reaches point E (67.3°F.), the second stage of heating is deactivated and, at point F (67.6°F.), the first stage of heating is deactivated. These differences of approximately 1° F. between the activation and deactivation temperatures for the heating stages introduces a controlled hysteresis in the heating system and reduces the tendency of the system to drift past the set point temperature and oscillate in an uncontrolled fashion.

When the sensed air temperature in the controlled zone passes point B on line 10, the controlled zone's damper in the heating supply duct is closed and its damper in the cooling supply duct is opened in a progressive fashion as the sensed temperature continues to rise. During operation of the air conditioning system through the aforedescribed heating stages, the ventilation and exhaust dampers which control the introduction of outside air into the system and discharge of return air from the system remain at their minimal open position, e.g., to permit introduction of 5 to 20 volume percent of fresh air based on total air circulated. In the event that the sensed temperature of the warmest controlled zone should rise to or above point G (68.2°F.), the control system will apply a signal to the ventilation motor controller to open the ventilation dampers in the fresh air inlet and exhaust damper in the air return duct and close the return air damper in the return air duct in a proportional manner, responsive to the magnitude of the control signal. The ventilation motor controller also receives a control signal that is proportional to the outside air enthalpy, typically outside air temperature, so that the ventilation and exhaust dampers will not open unless the outside air temperature is below the set point temperature of 68° F.

If the temperature in the warmest control zone continues to rise, and if the outside air temperature is, as previously described, below the set point temperature A, the ventilation damper will open progressively until, at point H (69° F) the ventilation air damper is fully open and the return air damper is fully closed and the air conditioning system is supplied with outside air only The controlled zone's dampers are also progressively opened to the cooling supply duct through which the outside air is circulated as the zone's temperature rises above 67.8° F. and is fully opened to the cooling supply duct, bypassing the heating facilities of the air conditioning system when its temperature reaches 68.2° F.

The air temperatures of the controlled zones are permitted to drift through a region from the temperature represented at point H (69°F.) until point I (80° F.) on the cooling curve 12 is reached. As previously mentioned, the set point temperature for the cooling facilities is represented by point K at 78° F. If the sensed temperature in the warmest controlled zone rises to or above 80° F., the first stage of the air cooling facilities is activated. Coincident with activation of the cooling facilities is the application of a control signal to the ventilation damper per motor controller to close the ventilation and exhaust dampers and open the return air damper so that the air cooling is applied to the cooler return air rather than to warm outside air. If the temperature continues to rise in the warmest zone, successive stages of mechanical cooling can be progressively activated with each increment of about 0.5° F. increase in temperature. Accordingly, FIG. 1 illustrates activation of the second stage of cooling at point J (80.5°F.). As with the air heating facilities, the air cooling facilities are provided with a limited degree of hysteresis in the control loop so that these cooling stages are deactivated at temperatures which are about 1° F. less than their activation temperatures. As illustrated, the second stage of cooling is deactivated at point L (79.5° F.) while the first stage is deactivated at point M (79°F.).

The aforedescribed control system provides a comfortable air environment with minimal energy expenditure. Outside air, when it is available at the requisite low enthalpy, is utilized for cooling of the controlled zones. When the air cooling facilities are activated, the ventilation air damper is closed so that the cooler return air rather than the warm outside air is cooled. The provision for multiple stages of heating and cooling and for a limited hysteresis in the control loop of these facilities as well as a staged or progressive activation and deactivation of a plurality of stages insures a minimal degree of cycling or oscillation of the heating and cooling facilities, thereby contributing to a maximum of comfort and energy conservation.

Figure 2:
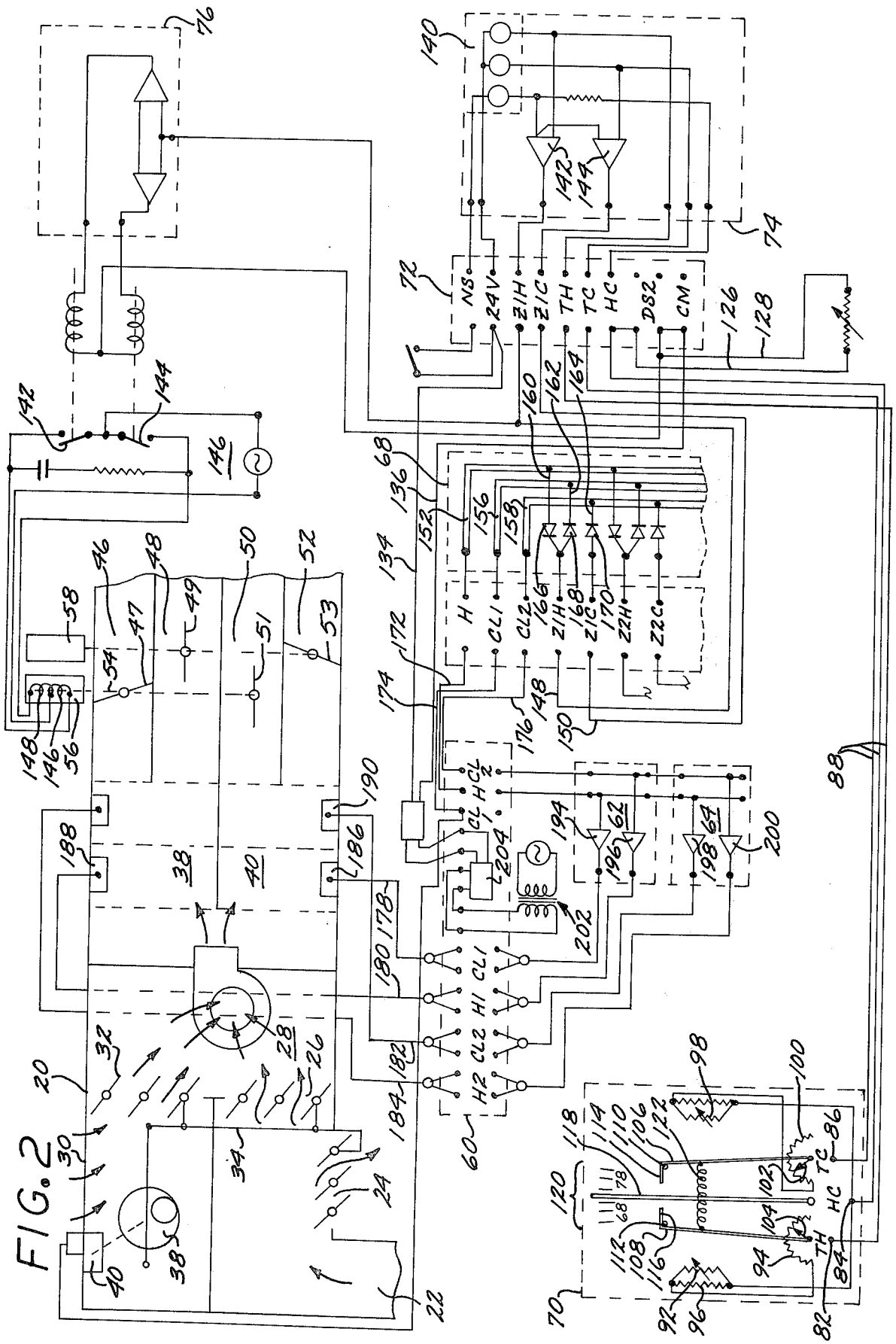
FIG. 2 is a schematic illustration of the air conditioning and control systems.

Referring now to FIG. 2, the schematic diagram of the control system and the air conditioning system will be described. The air conditioning system comprises heating and cooling facilities which can be in a compact unit such as a conventional roof top unit for a multiple zone building. The unit is contained within housing 20 having a plurality of ducts such as return air duct 22 which directs the return air from the various zones of the building into the housing 20 for recirculation to the building. The return duct 22 is provided with an exhaust damper 24 which vents return air outside the building and a return air damper 26 which introduces the return air into plenum chamber 28 of the housing. The housing 20 also has a screen member 30 for introduction of fresh air into the air conditioning system. A ventilation damper 32 is provided to control the rate of introduction of the fresh or outside air. The dampers 24, 26, and 32, are, preferably, interconnected by mechanical linkage 34 to provide a substantially constant flow of circulation air into the intake of fan 36 which is mounted within housing 20. The mechanical linkage 34 is actuated by suitable cam means 38 driven by ventilation damper motor 40 which is operated by control means described herein in succeeding paragraphs.

Fan 36 discharges a flow of ventilation air from plenum chamber 28 into and through heating deck 38 and cooling deck 40. Disposed within the heating and cooling decks are suitable heating and cooling facilities which, preferably, comprise a plurality of stages of heating means such as H-1 and H-2 and a plurality of stages of cooling means such as C-1 and C-2. The heating facilities are conventional and can be means such as oil or gas fired furnaces, heat exchangers which can be provided with low pressure or exhaust steam from power plants, electrical resistance heaters, etc. The stages of cooling comprise heat exchangers which are provided with a source of cooling medium such as cooling tower water or a refrigerant from a mechanical or gas fired regrigeration unit.

The heating deck 38 discharges into one or more heating supply ducts such as 46 and 48 and the cooling deck discharges into one or more cooling supply ducts such as 50 and 52 which extend to individual, controlled zones of the building, e.g., a first controlled zone being provided with heating duct 46 and cooling duct 50 which connect to a common supply duct to the zone while a second zone is provided with heating duct 48 and cooling duct 52 which also connect to a common supply duct leading to the zone. Individual zone dampers are provided in these supply ducts such as dampers 47, 49, 51 and 53 in ducts 46, 48, 50 and 52, respectively, The dampers which are in the ducts communicating with a single individual zone, e.g., dampers 47 and 51 are, preferably, mechanically interconnected by suitable mechanical linking means 54 which extends to the first zone damper control motor 56. Similarly the second controlled zone of the building is provided with a damper motor 58 which controls the positions of dampers 49 and 53. As previously mentioned, each of the controlled zones of the building is preferably provided with a suitable exhaust vent which discharges into a collector or header duct for return to the return air duct 22 of the ventilation system.

The control system for the aforedescribed air conditioning system comprises a number of modular units. The controls extending to the components of the air ventilation and conditioning system are connected to a load connector panel 60 that is located in a suitable position, preferably integral with housing 20 of the ventilation system. The connector panel 60 is provided with one or more of load analyzer circuit means 62 and 64 which are effective in a manner hereinafter described to operate successive stages of heating and/or cooling in a staged or progressive manner. The connector panel also has terminals for receiving the input signals from the controlled zones having the greatest demands for heating and cooling as supplied from zone selector contactor panel 66 and its associated zone selector circuit means 68. Each of the controlled zones of the building is provided with zone air temperature sensing means 70 which is positioned in the control zone at a suitable location to be responsive to the temperature of air within the zone. The output signals from the zone sensing means 70 are passed to a signal conditioner connector panel 72 for transmittal to signal conditioner circuit means such as 74 and for transmittal to the respective zone damper motor control circuit 76 which has outputs for controlling the direction and magnitude or rotation of the damper motor, such as motor 56, thereby positioning the damper, such as 47, in the feeder duct from the heating deck and the damper, such as 51, in the feeder duct from the cooling in response to the signals developed by temperature sensing means 70.

Within each of the controlled zones there is positioned a zone air temperature sensing means 70 which has circuit means for a plurality of set point temperatures and for generating a plurality of D.C. analog voltage signals therefrom. As shown in FIG. 2, the zone temperature sensing means includes a housing 80 within which are mounted a plurality of circuit means. Housing 80 is provided with three terminal posts 82, 84 and 86. A single, three lead connector 88 has one of its leads contacted to each of the terminal posts which are identified as TH, HC and TC on the housing. The circuit means within the housing comprises a first circuit having a lead 90 extending from the common terminal 84 to thermistor 92 which is in series with the windings 94 of a potentiometer.

Thermister 92 is a conventional thermister having a negative temperature coefficient. The thermister 92 is in parallel with a high value resistor 96. The high resistance value of resistor 96 in parallel with the thermister reduces the nonlinearity of the thermister to provide a substantially linear response to temperature changes. The other circuit of the temperature sensing means 70 is substantially identical and has a thermistor 98 in series with the windings 100 of a second potentiometer. The wiper contacts of the potentiometers are connected to their respective terminal posts in the housing 80, i.e., to terminal posts TH and to terminal post TC.

The wiper arms 102 and 104 of the potentiometers are mechanically linked to lever arms 106 and 108, respectively. These lever arms are pivoted at the wiper arm pivot point of the potentiometers and are restrained in their pivotal movement by stops 110 and 112 which project from an interior wall of housing 80. Each of arms 106 and 108 have a short inboard projection 114 and 116 and the ends of these projections are separated by a gap through which the thermostat adjustment lever 118 extends. Lever 118 is pivotally mounted in housing 80 by pin 120 and projects beside scale 121 which bears indicia which are calibrated in a temperature scale. The individual lever arms 106 and 108 are biased against their respective stops 110 and 112 by suitable spring means such as tension spring 122. The pivot end of these arms is mechanically linked to its respective wiper arm 102 or 104 of the potentiometer by adjustment means such as screw 124 whereby the angular relationship between the lever arm and its associated potentiometer wiper arm can be fixedly adjusted. The temperature sensing means 70 is thereby provided with two independent circuit means with internal adjustment means for variation of the circuit resistance which is useful to calibrate the circuit to a preselected resistance for a particular set point temperature and for a limited degree of external adjustment by lever 118 to levels below or above the preselected set point temperatures with a band of 4° to about 15°, preferably about 10°F., between those set point temperatures. In the embodiment described herein, the circuit means connected between terminals HC and TH generates a heating and ventilation control signal about a set point temperature of 68° F. with means permitting adjustability to a lower set point temperature, e.g., to as low as 55° F. Typically, a range could be from 55° to 70° F. Similarly, the sensing means 70 contains a second circuit between terminals HC and TC which is calibrated about a second, higher temperature set point such as 78° F. with means permitting to a higher set point temperature, e.g., to 85°F. Typically, a range could be from 75° to 85° F. The fixed adjustability of these circuits by the internal variation between the angular orientation of arms 106 and 108 and their respective potentiometer wiper arms 102 and 104 provides a facile means for factory adjustment of the low and high set point temperatures.

The terminals of zone temperature sensing means 70 are connected by connector 88 to the corresponding terminal posts identified as TH, TC and HC on connector panel 72. Connector panel 72 has a plurality of other input terminals to receive connector leads 126 and 128 which extend to another thermister 130 and its associated parallel resistor 132. Thermistor 130 is located in the duct to the controlled zone, downstream of the dampers which communicate with hot and cold decks. Preferably this thermister is in the roof top unit in the common duct connected to the feeder ducts such as 46 and 50 and is responsive to the temperature of the conditioned air supplied to its controlled zone. The terminal panel 72 is also supplied with a source of 24 volts D.C. regulated voltage supply through leads 134 and 136 which are connected, respectively, through the terminal posts identified as 24 V and CM on terminal connector panel 72. A switch 138 is provided between terminal posts 24 V and NS on the connector panel. This switch means 138 can be a manually actuated or, preferably, a timer controlled switch to open the controlled zones' dampers to the hot deck. Associated with this is relay means (not shown) to switch out the control system, close the fresh air and exhaust dampers, and to connect the heater controls to an independent control set at a low night time temperature.

Circuit means are provided for conditioning the signals generated by the zone temperature sensing means to produce DC analog signals therefrom having a polarity corresponding to the direction and a magnitude proportional to the degree of the deviation of the sensed temperature from the set point temperature. The signal conditioning circuit means is shown as circuit 74 which, preferably, is a modular unit on a circuit board adapted for plug-in connection to the terminals on terminal connector panel 72.

Signal conditioning circuit means 74 includes a regulated or constant current supply circuit 140 and a pair of operational amplifiers 142 and 144 for comparing the D.C. voltage signals from temperature sensing means 70 to a reference signal and generating output signals therefrom at terminals Z1H and Z1C which have a polarity and magnitude proportional to the direction and magnitude of deviations of sensed temperatures in unit 70 from the set point temperatures thereof.

The individual zone damper motor such as 56 is actuated by a control circuit 76 which receives a signal from terminal Z1H of the signal conditioning circuit 74. This signal is applied to a common input of two cross-connected operational amplifiers which, in a manner hereinafter described, are furnished with positive feedback to provide an unstable condition and impart a "latch-on" characteristic to their operation. The damper motor actuator circuit is thus operative to provide a D.C. voltage signal to either of its terminals R or L which is effective to actuate relay contacts 142 or 144, respectively, that are in the 120 volt A.C. supply circuit 146 to either of the split motor windings 146 or 148 of damper actuator motor 56. These windings are effective to induce clockwise or counterclockwise rotation of the shaft of this motor, thereby adjusting the relative positions of dampers 47 and 51 in the heating and cooling supply ducts 46 and 50 respectively.

The conditioned signals developed at terminal Z1H and Z1C of signal conditioning circuit 74 are applied through the connector panel 72 and connectors 148 and 150 to a zone selector connector 66 with its associated zone selector circuit means 68. The zone selector means of connector panel 66 and circuit means 68 are operative to select the conditioned signal of the greatest demand from a plurality of controlled zones. Accordingly, while components 130, 70, 72, 74 and 76 are provided for each of the controlled zones, the components 62, 64, 66 and 68 hereinafter described serve a plurality of controlled zones. The connector panel 66, therefore, receives a plurality of conditioned signals reflective of heating, ventilating and cooling demands from each of the plurality of controlled zones. These input signals are received on additional terminals such as those identified as Z2H and Z2C illustrated on connector panel 66.

Associated with connector panel 66 is zone selector circuit means 68 in the form of a circuit board bearing three busses 152, 156 and 158 that extend from output terminals identified as H, C1 and C2. The busses extend the length of circuit board and are connected to a plurality of leads such as 160, 162 and 163, each of which contains diode means 166, 168 and 170. As described hereinafter the diode means are operative to select the heating, ventilating and cooling control signals of the greatest deviation from a plurality of controlled zones and apply the selected signals to the H, c1 and C2 terminals, respectively, of the zone selector circuit means 68.

The output terminals H, C1 and C2 on panel 66 are connected by leads 172, 174 and 176 to similarly identified terminals on the load analyzer connector panel 60. The connector panel 60 has a plurality of terminals for receiving for aforedescribed control signal inputs and a plurality of output terminals identified as Cl1, H1, Cl2 and H2 which are connected by two conductor leads 178, 180, 182 and 184 to the controllers 186 of the first stage of air cooling means, 188 of the first stage of air heating means, 190 of the second stage of air cooling means and 192 of the second stage of air heating means, respectively. The C1 connector 174 is also connected through lead 185 to controller 41 which regulates the ventilation and exhaust damper motor 40. There is also provided temperature sensing means, not shown, to sense the outside air temperature and apply a control signal to controller 41 to over ride the signal from C1 and close the ventilation damper means when the outside air temperature rises above a predetermined value, usually in the range of 68° to 73° F., typically 70°F.

A plurality of load analyzer circuit means such as 62 and 64 are provided for selective operation of the plurality of stages of heating and cooling means and for imparting a preselected degree of hysteresis in the cyclic operation of these stages. Each circuit means 62 and 64 is provided as a modular unit which controls a respective stage of heating and cooling with the use of summing operational amplifiers such as 194 and 196 which compare the control signal to reference signals and employ a feedback circuit hereinafter described to achieve a desired hysteresis in the activation and deactivation of the stages of heating and cooling. The circuit means such as 64 for successive stages of heating and cooling have similar operational amplifiers 198 and 200 which are provided with a reference signal and feedback circuit means to require input signal of greater deviation for activation than the corresponding operational amplifiers in the preceeding circuit means 62, thereby providing a staged or progressive activation and deactivation of these stages of heating and cooling as described hereinafter in greater detail.

The remainder of the circuit means for the control system includes means to generate a 24 volt direct current source of regulated voltage. This comprises suitable transformer means 202 to generate a 24 volt A.C. signal that is supplied to full wave rectivation circuit means 204 and regulator 205 which provide a constant voltage regulated D.C. voltage source to connector leads 134 and 136.

Figure 3:
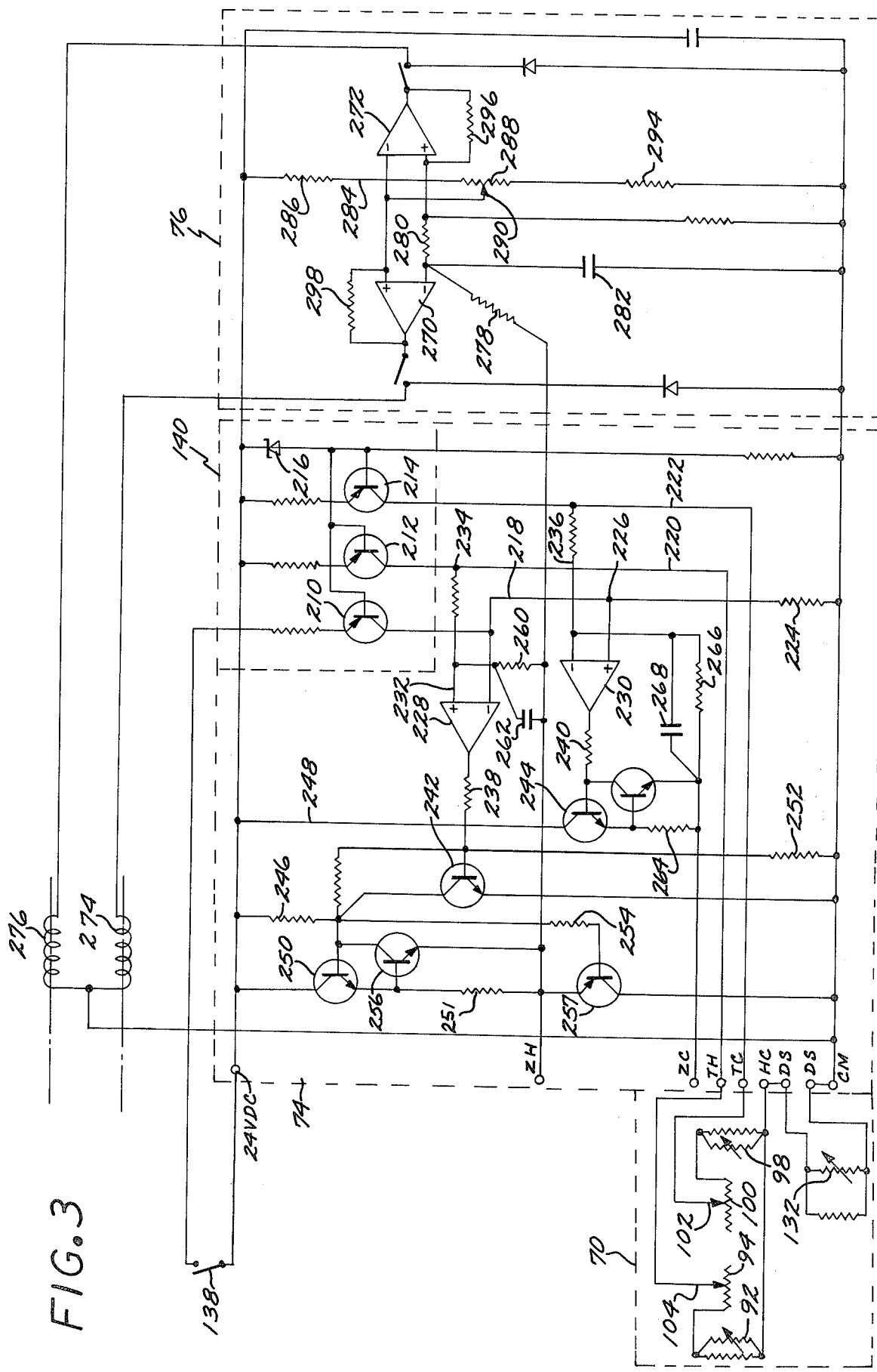
FIG. 3 illustrates the signal conditioning circuit and the individual zone damper motor control circuits.

The zone temperature sensing means 70 and the circuits contained therein are portions of a comparator circuit which provides input signals to summing amplifiers in the signal conditioning circuit contained in circuit means 74. Referring now to FIG. 3, this circuit will be described in greater detail. The circuit includes a current regulating supply circuit 140 having a plurality of transistors 210, 212 and 214 which have their emitter and collector terminals connected in series with the sensor network of unit 70 and the reference resistor 224 and their bases biased with a constant voltage source which is the breakdown voltage of Zener diode 216, thereby insuring a relatively constant current supply through each of the legs. These legs are reference leg 218, first input signal leg 220 and second input signal leg 222. The first input signal leg 220 extends to the TH terminal of the circuit board through the three lead connector 88 (FIG. 2) to the TH terminal of the zone temperature sensing means 70. The leg extends through the heating and ventilation signal generating circuit of the sensing means 70, including winding 94 of the variable potentiometer and thermister 92, returning to the HC and DS terminals of the circuit board panel. The leg then extends through the duct temperature circuit means including thermister 132 and returns to the other DS terminal of the connector panel. The leg also extends through the DS terminal to the common or ground terminal of the circuit means 74.

The reference signal leg 218 of the comparator circuit includes a resistance 224 of a fixed value to provide a voltage drop that will provide the desired reference voltage at point 226. This reference voltage developed at point 226 is applied to the minus terminal of summing operational amplifier 228 and the plus terminal of summing operational amplifier 230 as the reference signal thereto. Connector 232 is extended from the input positive terminal of amplifier 228 to connection with leg 220 at point 234 to provide an input signal to summing operational amplifier 228. Similarly, connector 236 extends to a connection with the leg 222 for application of an input signal to the negative terminal of summing amplifier 230. The output signal from amplifiers 228 and 230 are applied through load resistors 238 and 240 to the base connections of transistors 242 and 244. Resistor 252 is located between the base of transistor 242 and the common terminal of the voltage supply. The current supply to the collector of transistor 242 is from the 24 V D C buss through resistor 246. The base of transistor 250 is connected to the collector terminal of transistor 242 so that the collector voltage of transistor 242 is applied to the base of transistor 250. A transistor 257 of opposite polarity, PNP type, is located between the ZH and common terminals with its base connected to the collector terminal of transistor 242 through resistor 254 thereby providing for an output signal between terminals ZH and the common terminal over a wide range of voltages in response to the output of summing amplifier 228. Transistor 256 is provided with its collector connected to the base of transistor 250 and its emitter connected to the ZH terminal. This transistor is biased to a saturated condition by the application of a small potential, e.g., about two volts across the resistor 251, in series with transistor 250. The resistor 251 has a value such that a safe current through it, and transistor 250, will produce 2 volts and saturate transistor 256, limiting the drive voltage to the base of transistor 250 and thereby serving as a protective switch to avoid destruction of the transistor 250 in the event that the ZH terminal is inadvertently grounded during installation of the circuit.

Operation amplifier 228 is provided with a feed-back to the signal input connector 232 by resistor 260 which is in parallel with capacitor 262. The value of resistor 260 is selected so as to achieve the desired gain in amplifier 228 while capacitor 262 serves to eliminate any voltage spikes from the feedback signal in accordance with customary techniques.

The input signal from the TC terminal and the leg 222 of the comparator circuit which passes through the thermister circuit that is adjusted to the higher set point temperature is applied to the negative input terminal of operational amplifier 230. The summed output from this amplifier is passed through load resistor 240 to the base of transistor 244. The emitter of transistor 244 is connected to the output terminal ZC through current limiting circuit resistor 264. Feedback to amplifier 230 is made through resistor 266 in parallel with capacitor 268.

When the temperature in the control zone departs from the set point temperature, the resistance value of thermisters 92 and 98 are changed from their initial values, decreasing with increasing temperatures. With an increase in sensed temperature, the value of thermister 92 decreases and the current is maintained constant by regulator 140, lowering the voltage at point 234. This activates summing amplifier 228 to supply an amplified lower output to the base of transistor 242 which raises the voltage to the base of transistor 250 and supplies an amplified output signal to terminal ZH above the 12 volt, nominal output condition. Similarly a decrease in the sensed temperature results in an increase in resistance of thermister 92 and a higher voltage at point 234 generating a positive output from amplifier 228 which, through transistor 242 and transistor 250, results in a lower amplified output at terminal ZH.

The relative values of the components of the temperature sensing and signal conditioning circuits are chosen to provide a high sensitivity in the circuit. The thermisters 92 and 98 are preset to greater sensitivity to temperature changes than duct sensing thermister 132 by proper selection of the parallel resistance values connected across these thermisters. Typically, the thermisters 92 and 98 with proper parallel resistors connected across their terminals provide a negative temperature coefficient of about 50–150 ohms per degree Fahrenheit while that of thermister 132 is from about 1 to about 10 ohms per degree Fahrenheit. The temperature sensing circuits produce output voltages which range from about 2 to about 22 volts D.C. when using a 24 volt D.C. supply.

Also illustrated in FIG. 3 is the control circuit 76 for the individual zone damper motor. This control circuit comprises a bridge circuit having two operational amplifiers 270 and 272 with their input terminals cross connected and their output terminals connected to the winding of relays 274 and 276 which control switches 142 and 144, (FIG. 2) respectively, in the 120 volt A.C. supply to the windings of the damper motor. The operational amplifiers 270 and 272 function as switches in the low voltage circuit to the relay windings to control the direction of rotation of damper motor 56. The two amplifiers are coupled with a dead band provision to avoid continual operation of the motor with small random variations of thermostatic input signal.

The input signal developed at terminal ZH of the signal conditioning circuit is applied through resistor 278 to the negative input of operational amplifier 270. The signal is also applied through dropping resistor 280 to the positive terminal of operational amplifier 272. A capacitor 282 is provided as a filter means to shunt momentary peak voltages to the common or ground terminal. The other leg of the bridge circuit is leg 292 which includes resistor 294 and a variable resistance from potentiometer 288 in response to movement of the damper motor.

The operational amplifiers 270 and 272 are provided with feedback means including resistors 296 and 298. The feed-back is made to the positive input terminal, thereby driving these amplifiers into an unstable condition where the amplifiers function as circuit switching means.

Resistor 280 in the input connector to the amplifiers serves as a voltage dropping means to impose a slightly lower voltage on the positive terminal of operation amplifier 272 than that imposed on the negative terminal of amplifier 270. Typically, the difference in potential applied to these amplifiers can be about 0.05 volts to provide a dead band in the input signal required to activate either of these amplifiers. This avoids rapid switching of these amplifiers and continued reversing action of the motor when the input signal at terminal ZH is at or near their balancing voltage. Additionally, the positive feedback to each of the amplifiers serves to impart a "latch-on" effect to the switching action of these amplifiers in that the amplifiers are stabilized in their conducting condition. The amplifiers are turned off by the rebalancing of the bridge circuit leg 292 resulting from the repositioning of wiper contact 290 of potentiometer 288 by rotation of the damper motor 56. As the bridge circuit is rebalanced and the conducting operational amplifier is switched to off, the feedback voltage through its feedback loop ceases. The resulting "latch-off" action is designed to produce about 0.025 volt change so that the circuit is restored in its non-conducting mode at the center of the dead band, thereby requiring that the input error signal must change by at least 0.025 volts before either of the amplifiers 270 and 272 will be switched into a conducting mode.

The conditioned signals developed at the ZH and ZC terminals of the signal conditioning circuit are applied to appropriate terminals of the zone selector terminal connector panel 66 shown in FIG. 2. Associated with this connector panel is a zone selector circuit means 68 and there are pairs of input terminals for each of the controlled zones in the control system. The zone selector circuit 68 is operative to select the maximum demand signals for air heating and for air cooling that are developed by any of the controlled zones. This is accomplished by a plurality of diode logic circuits. As previously described, the zone selector circuit 68 has a heating buss 152, a ventilating buss 156 and a cooling buss 158. These busses are connected by leads 160, 162 and 164, respectively, to the appropriate input terminals; connectors 160 and 162 are connected to a single ZH input terminal through diodes 166 and 168. Diode 166 has its anode connected to ventilating buss 156. Diode 170 in lead 164 has its cathode connected to mechanical cooling buss 158.

The voltage level at heating buss 152 will always be substantially the same value as the maximum demand signal voltage level input from any of the controlled zones. Accordingly, the zone having the input voltage of the lowest magnitude will be applied to buss 152, biasing the remaining diodes such as 166 which are connected to the input ZH terminals from other zones into nonconducting modes. Similarly, the zone producing the maximum voltage input at its ZH terminal will have this voltage transmitted by its diode 168 to the ventilating buss 156, raising the voltage on this buss to substantially the input voltage and biasing the remainder of the respective diodes 168 connected to input ZH terminals from other zones into nonconducting modes. A similar action occurs to raise the voltage on buss 158 to substantially the most positive input voltage from any of of the ZC terminals of the control zones so that this buss 158 has substantially the same voltage as developed by the controlled zone having the greatest cooling demand. The aforesaid voltages developed on busses 152, 156 and 158 are transmitted by leads 172, 174 and 176 to the H, C1 and C2 terminals, respectively, of connector panel 60.

Referring now to FIG. 4 there is illustrated the load analyzer circuit employed in the invention. The analyzer circuit is operative to apply the input command signals from the controlled zones of greatest demand to activate the air heating and air cooling means of the air conditioning system. Additionally, the circuit contains means to introduce a limited degree of hysteresis in the control cycle in a manner hereinafter described. The load analyzer circuit employs operational amplifiers with balanced bridge input circuits and with their outputs being applied to switching transistors in relay circuits which control the air heating and air cooling means. As illustrated in FIG. 4 the heating portion of the load analyzer circuit comprises operational amplifier 300 which has a balanced bridge input circuit comprising one leg applied through potentiometer 302 to the inverting input terminal of the amplifier. The heating demand signal from the H terminal is applied through resistor 304 to the non-inverting input terminal. As described with regard to FIG. 1, the first stage of heating is to be activated at about 66.7° F. corresponding to an input voltage of about 5 volts, and, accordingly, the bridge circuit is balanced to supply a reference signal input to the inverting terminal of approximately 5 volts. When the input signal through resistor 304 decreases to below six volts, operational amplifier 300 is switched to a conducting mode with its output being applied through resistor 306 to the base of switching transistor 308. This voltage applied to the base of transistor 308 is sufficient to bias the transistor into saturation, conducting current from the 24 volt input buss 310 through the coil of relay 312 and closing relay contacts 314. The relay contact 314 is in the gate circuit of triac 316 and closing of contacts 314 gates the triac into conduction and activates the controller for the first stage of heating. A diode 315 is placed across the coil 312 to conduct any transient or induced voltages from the coil to ground, avoiding damage to transistor 308.

A limited degree of hysteresis is introduced in the control circuit by the application of a feedback voltage through resistor 318 to the reference signal input terminal of operational amplifier 300. When transistor 308 is biased into a conducting mode, substantially the entire 24 volts D.C. potential appears across the coil of relay 312. This voltage is dropped by resistor 318 to provide an input voltage to the inverting terminal of the operational amplifier of approximately 10 volts D.C. so that the amplifier will remain in a conducting mode until the input signal from the H terminal of the circuit increases to about 10 volts, which, as shown in FIG. 1, corresponds to a measured zone temperature of about 67.7° F. There is thus introduced a hysteresis of about 1° F. in the heating control circuit.

The load analyzer components for the cooling operation of the circuit are substantially the same as those described with reference to the heating control circuit. These components include an operational amplifier 320 with a balanced bridge input to the non-inverting terminal that includes potentiometer 322 and resistor 325 whereby a voltage of approximately 20 volts is applied to the non-inverting terminal of the amplifier. The cooling command signal received at terminal C2 of the circuit is applied through resistor 324 to the inverting terminal of the operational amplifier and, when this input voltage exceeds 20 volts, amplifier 320 is activated into a low mode, developing an output voltage across resistor 326 which is applied to the base of transistor 328 and which is sufficient to bias this transistor into a conducting mode. This applies the 24 volt D.C. line voltage from buss 310 to the coil of relay 330 closing the contacts of the relay and gating triac 332 into conduction, thereby activating the controller of the air cooling means of the air conditioning system.

The voltage applied to the coil of relay 330 is also applied, through a feedback circuit including voltage dropping resistor 334, to the inverting input terminal of the operational amplifier. The effect of the application of this potential is to lower the voltage of the input signal to the operational amplifier 320 and require that the voltage of the input signal decrease to about 15 volts before the amplifier will cease conducting. As apparent from FIG. 1, this voltage level signal is generated at about 79° F., thereby introducing about 1° F. of hysteresis in the activation cycle of the air cooling means.

Frequently the air conditioning system will be employed with a plurality of stages of heating and cooling facilities, and, accordingly, it is desirable to make provisions for a facile connection of additonal modules of load analyzer and controlling circuits similar to those described to those of FIG. 4. FIG. 5 illustrates such an additional module of control facilities. This module includes operational amplifiers 340 and 342 which control the second stages of cooling and heating, respectively. The operational amplifiers and components of the circuit shown in FIG. 5 are substantially identical to those described with regard to FIG. 4. The operational amplifiers are, however, provided with bridge circuit means to generate reference signals of different voltages and with different feedback circuit components whereby input cooling signals of greater magnitude and input heating demand signals of lesser magnitude are required for activation of the control circuits than are required for the signals which activate the circuits shown in FIG. 4. Adjustment of the requisite level of activating signals for this circuit can be made by the adjustment of the bridge circuit through potentiometer 344 to operational amplifier 340 and potentiometer 346 to operational amplifier 342. In a typical application such as that illustrated in FIG. 1, the input reference signal applied to the negative terminal of operational amplifier 342 in the heating circuit is approximately 4 volts D.C. while the value of voltage dropping resister 348 in the feedback circuit to this terminal is such to raise this voltage to about 7.5 volts when transistor 350 is in the conducting mode. Similarly, the potentiometer 344 is adjusted to apply approximately 21.5 volts to the non-inverting, reference input terminal of amplifier 340. The load dropping resistor 352 in the feedback circuit to the inverting, input terminal of this amplifier is of sufficient value such that when transistor 351 is in the conducting mode, the input signal is decreased by an increment of about 5 volts which constitutes the limited degree of hysteresis introduced into the control circuit.

Figure 6:
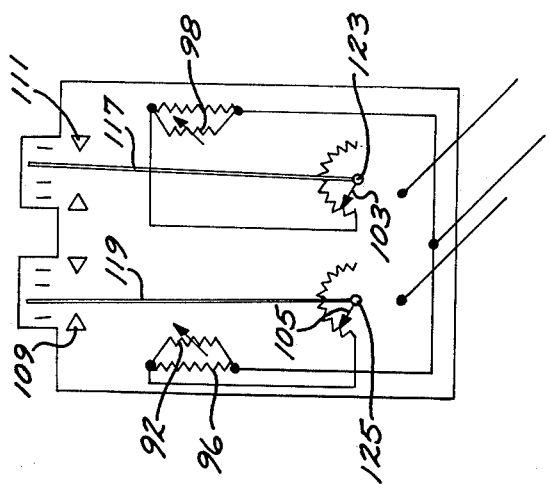
FIG. 6 illustrates an alternative thermostatic control device.

FIG. 6 illustrates an alternative thermostat, i.e., temperature sensing means, that can be employed in the invention. In this embodiment separate control levers 117 and 119 are provided whereby the upper and lower set point temperatures, respectively, can be adjusted. As shown, the levers 117 and 119 are pivotal about pins 123 and 125, respectively. The levers have a limited degree of pivotal adjustment between fixed abutments or stops 109 and 111 that are disposed to either side of the levers. The levers are interconnected to their respective potentiometer wiper arms 103 and 105 by suitable adjustment screw means whereby the angular relationship between the wiper arms and levers can be fixedly adjusted in a factory calibration step. Typically, the fixed adjustment of these mechanical parts would be set such that the lever 117, which controls the cooling facilities of the air conditioning system, could not be moved below an upper set point temperature, e.g., about 78° F., while the lever 119, which controls the heating and ventilating facilities of the air conditioning system, could not be moved above the lower set point temperature of about 68° F.

The invention has been described with reference to a presently preferred and illustrated embodiment. It is apparent that various changes in components and operation of the system can be changed without substantially departing from the scope of the invention. Accordingly, it is not intended that the invention be unduly limited by the illustrated and presently preferred embodiment thereof. Instead, it is intended that the invention be defined by the elements and their obvious equivalents set forth in the following claims.

What is claimed is:

1. An environmental air conditioning control system for a building having a zone of controlled air temperature therein with air conditioning means including air heating, air cooling and air circulation means including means to return air from said zone to said conditioning means which comprises:

zone air temperature sensing means for simultaneously generating a first sensor signal proportional to the deviation of said zone air temperature below a first set point and a second sensor signal proportional to the deviation of said zone air temperature above a second set point temperature, higher than said first set point temperature with said first and second signals being of discontinuous proportionation, offset by a band of from 4° to about 15° F.;

a plurality of air conditioning controller means; each associated with a respective air cooling means and air heating means; and circuitry connected between said zone temperature sensing means and said controller means to apply simultaneously: (1) a first control signal, responsive to said first sensor signal to said controller of said heating means and (2) a second control signal, responsive to said second sensor signal, to said cooling means.

2. The control system of claim 1 for use with said air conditioning means which also includes air ventilation damper means to provide a controlled proportion of fresh and return air to said air circulation means and air ventilation damper controller means associated therewith;

means to generate a third sensor signal proportional to the deviation of said zone air temperature above said first set point temperature; and circuitry connected between said zone temperature sensing means and said ventilation damper controller means to apply thereto a third control signal, responsive to said third sensor signal.

3. The control system of claim 2 wherein said sensing means permits setting said first set point temperature at a value in the range from 55° to 70° F.

4. The control system of claim 3 wherein said sensing means permits setting said second set point temperature at a value in the range from 75° to 85° F.

5. The control system of claim 4 wherein said sensing means provides a band of about 10° F. between said set point temperatures.

6. The air conditioning system of claim 1 as employed for a building having a multitude of zones of controlled air temperature and including logic circuitry between said zone temperature sensing means and said controller means whereby the sensor signals of greatest magnitude developed in said multitude of zones are applied to their respective air conditioning controller means.

7. The air conditioning system of claim 6 for use with said air circulation means including individual air supply duct means to each zone from said air heating and air cooling means of said air conditioning system with damper means therein and damper actuator means to control the circulation rate of air from each of said heating and cooling means.

8. The air conditioning system of claim 7 including controller means for said damper actuator means and circuitry therefore whereby said first control signal applied to said controller means of said air conditioning system is also applied to control the relative positions of the damper means in said heating and cooling supply ducts to said individual zones.

9. The air conditioning system of claim 7, including temperature sensing means disposed in the supply duct means to each of said zones and effective to modulate the sensor signals for its respective zone responsive to the sensed temperature within said supply duct means.

* * * * *